US010829082B2

(12) United States Patent
Campbell et al.

(10) Patent No.: US 10,829,082 B2
(45) Date of Patent: Nov. 10, 2020

(54) AIRBAG DEVICE

(71) Applicant: Nissan North America, Inc., Franklin, TN (US)

(72) Inventors: Stephanie Campbell, Livonia, MI (US); Brian Downey, Westland, MI (US)

(73) Assignee: Nissan North America, Inc., Franklin, TN (US)

( * ) Notice: Subject to any disclaimer, the term of this patent is extended or adjusted under 35 U.S.C. 154(b) by 114 days.

(21) Appl. No.: 15/884,590

(22) Filed: Jan. 31, 2018

(65) Prior Publication Data
US 2019/0232912 A1  Aug. 1, 2019

(51) Int. Cl.
*B60R 21/235* (2006.01)
*B60R 21/206* (2011.01)

(52) U.S. Cl.
CPC .......... *B60R 21/235* (2013.01); *B60R 21/206* (2013.01); *B60R 2021/23514* (2013.01)

(58) Field of Classification Search
CPC ... B60R 21/206; B60R 21/235; B60R 21/239; B60R 2021/23169; B60R 2021/23509; B60R 2021/23514; B60R 2021/2395
See application file for complete search history.

(56) References Cited

U.S. PATENT DOCUMENTS

| | | | | |
|---|---|---|---|---|
| 3,807,754 A | * | 4/1974 | Rodenbach ........... | B60R 21/235 280/743.1 |
| 3,937,488 A | * | 2/1976 | Wilson ................. | B60R 21/235 280/736 |
| 5,044,663 A | * | 9/1991 | Seized ................. | B60R 21/233 264/515 |
| 5,110,666 A | * | 5/1992 | Menzel ................. | B60R 21/235 280/728.1 |
| 5,114,180 A | * | 5/1992 | Kanni ................... | B60R 21/235 280/739 |
| 5,131,434 A | * | 7/1992 | Krummheuer ........ | B60R 21/235 139/116.1 |
| 5,215,795 A | * | 6/1993 | Matsumoto ........... | B60R 21/235 139/389 |
| 5,277,230 A | * | 1/1994 | Sollars, Jr. ............ | B60R 21/235 139/389 |
| 5,280,952 A | * | 1/1994 | Hirabayashi ........... | B60R 21/23 280/739 |
| 5,375,878 A | * | 12/1994 | Ellerbrok ................ | D03D 1/02 280/743.1 |
| 5,441,798 A | * | 8/1995 | Nishimura ........... | B01D 39/083 442/205 |

(Continued)

FOREIGN PATENT DOCUMENTS

| | | |
|---|---|---|
| DE | 102006043552 A1 | 3/2008 |
| EP | 0570098 A2 | 11/1993 |

(Continued)

*Primary Examiner* — Laura Freedman
(74) *Attorney, Agent, or Firm* — Global IP Counselors, LLP

(57) ABSTRACT

An airbag device includes a first section and a second section. The first section is defined by a first material having a first heat dissipating characteristic. The second section is defined by a second material having a second heat dissipating characteristic. The second section dissipates heat at a higher rate than the first section when the airbag device is deployed.

14 Claims, 5 Drawing Sheets

(56) References Cited

U.S. PATENT DOCUMENTS

| | | | | |
|---|---|---|---|---|
| 5,489,117 | A | * | 2/1996 | Huber .................... B60R 21/26 280/738 |
| 5,501,488 | A | * | 3/1996 | Saderholm ............ B60R 21/233 280/739 |
| 5,542,703 | A | * | 8/1996 | Beasley ................ B60R 21/235 280/739 |
| 5,669,628 | A | * | 9/1997 | Kaufmann ............ B60R 21/239 280/739 |
| 5,671,935 | A | * | 9/1997 | Berger ................. B60R 21/231 280/743.1 |
| 5,685,347 | A | * | 11/1997 | Graham .................. B60R 21/23 139/390 |
| 5,776,839 | A | * | 7/1998 | Dischler ............... B60R 21/235 428/911 |
| 5,881,776 | A | * | 3/1999 | Beasley, Jr. ........... B60R 21/235 139/389 |
| 6,019,390 | A | | 2/2000 | Keshavaraj |
| 6,135,488 | A | * | 10/2000 | Bosio .................... B60R 21/235 280/728.1 |
| 6,299,206 | B1 | * | 10/2001 | Keshavaraj ........... B60R 21/231 280/729 |
| 6,419,267 | B1 | | 7/2002 | Hashimoto et al. |
| 6,672,618 | B2 | * | 1/2004 | Keshavaraj ........... B60R 21/231 280/743.1 |
| 7,264,269 | B2 | * | 9/2007 | Gu ........................ B60R 21/232 280/729 |
| 7,517,570 | B1 | | 4/2009 | Li et al. |
| 7,549,669 | B2 | | 6/2009 | Keshavaraj |
| 7,654,561 | B2 | * | 2/2010 | Webber ................. B60R 21/233 280/729 |
| 7,661,700 | B2 | | 2/2010 | Imamura et al. |
| 7,717,460 | B2 | | 5/2010 | Franke et al. |
| 8,430,425 | B2 | | 4/2013 | Marable et al. |
| 8,642,489 | B2 | | 2/2014 | Ise |
| 9,079,558 | B2 | | 7/2015 | Crouch |
| 10,155,496 | B2 | * | 12/2018 | Faruque ............... B60R 21/239 |
| 2006/0205302 | A1 | * | 9/2006 | Woydick ............. B29C 66/1122 442/76 |

FOREIGN PATENT DOCUMENTS

| | | | | |
|---|---|---|---|---|
| JP | 06340242 | A | * 12/1994 | .......... B60R 21/233 |
| JP | 09132105 | A | * 5/1997 | |

* cited by examiner

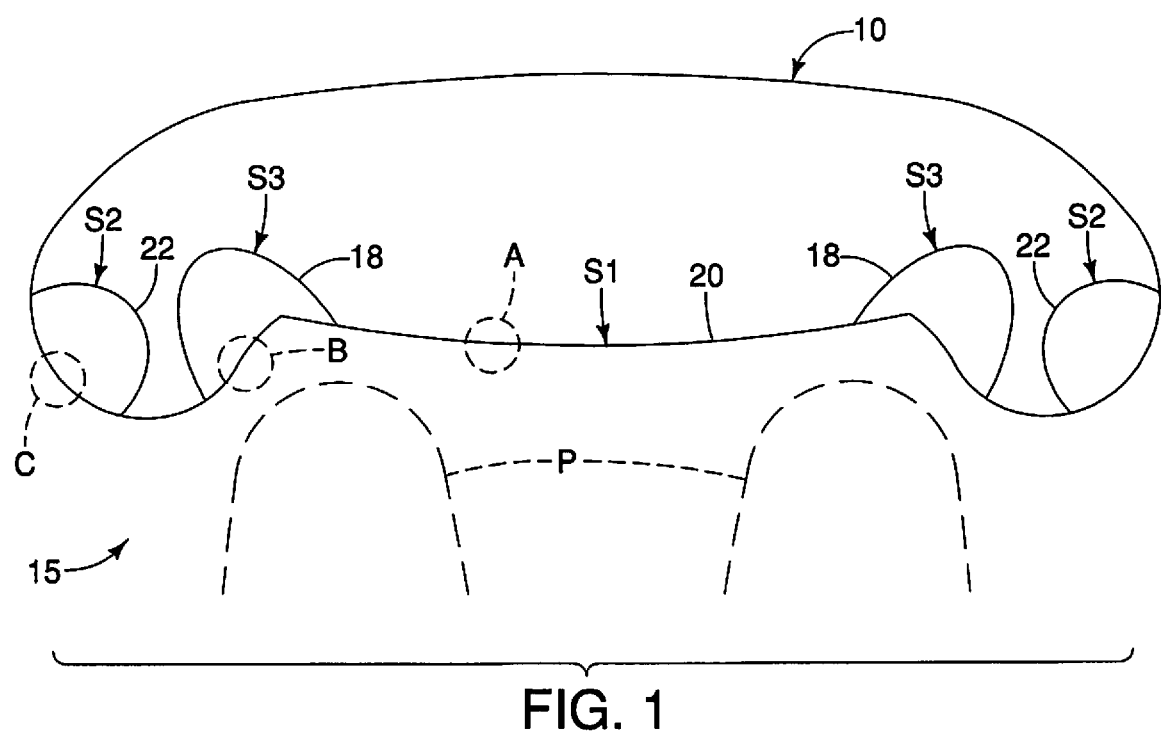
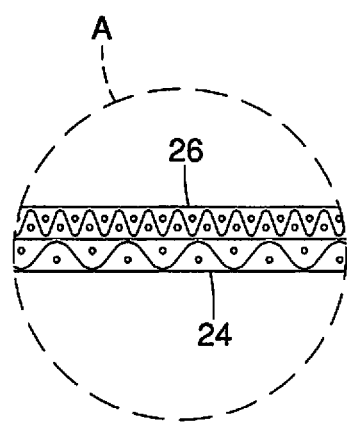 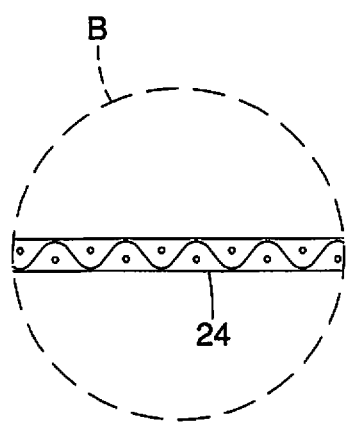 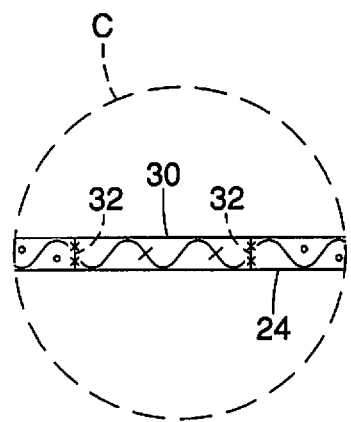
FIG. 2   FIG. 3   FIG. 4

US 10,829,082 B2

AIRBAG DEVICE

BACKGROUND

Field of the Invention

The present invention generally relates to an airbag device. More specifically, the present invention relates to an airbag device having a plurality of zones having different properties.

Background Information

Airbags are known in the motor vehicle field to be inflated from a storage position into a deployed position by filling an envelope with gas in the event of the vehicle contacting an external object with a predetermined impact force or greater. It has been known to construct an airbag by coupling two or more panels or zones together using seams to couple at least two airbag cushion panels. Typically, airbag assemblies include a housing having a vent opening provided in the wall of a housing for venting the gas from the housing after deployment.

SUMMARY

It has been discovered that it is desirable for different types of airbags to permeate gas and heat at different rates depending on various factors.

In view of the state of the known technology, one aspect of the present disclosure is to provide an airbag device comprising a first section and a second section. The first section is defined by a first material having a first heat dissipating characteristic. The second section is defined by a second material having a second heat dissipating characteristic. The second section dissipates heat at a higher rate than the first section when the airbag device is deployed.

In view of the state of the known technology, another aspect of the present disclosure is to provide an airbag device comprising a first section, a second section and a third section. The first section has a first permeability characteristic. The second section has a heat dissipating characteristic. The third section has a second permeability characteristic that is different from the first permeability characteristic such that an overall permeability characteristic of the airbag device is between the first and second permeability characteristics. The heat dissipating characteristic of the second section is different from a heat dissipating characteristic of both the first and third sections.

In view of the state of the known technology, another aspect of the present disclosure is to provide an airbag device a first permeability section and a passenger contact section. The first permeability section enables venting of gas from the airbag through the first permeability section without need for an open vent. The passenger contact section is disposed directly next to the first permeability section.

Also, other objects, features, aspects and advantages of the disclosed airbag device will become apparent to those skilled in the art from the following detailed description, which, taken in conjunction with the annexed drawings, discloses preferred embodiments of the airbag device.

BRIEF DESCRIPTION OF THE DRAWINGS

Referring now to the attached drawings which form a part of this original disclosure:

FIG. 1 is a top diagrammatic view of an airbag device having a plurality of zones in accordance with a first illustrated embodiment, with the airbag device illustrated in a deployed state;

FIG. 2 is an enlarged partial cross-sectional view of the circled portion A of the airbag device indicated in broken lines on FIG. 1;

FIG. 3 is an enlarged partial cross-sectional view of the circled portion B of the airbag device indicated in broken lines on FIG. 1;

FIG. 4 is an enlarged partial cross-sectional view of the circled portion C of the airbag device indicated in broken lines on FIG. 1;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring now to FIGS. 1 and 5 to 7, an airbag device 10 for a vehicle V is illustrated in accordance with a first embodiment. Here, the airbag device 10 is a vehicle airbag designed to inflate between a dashboard D of the vehicle V and an occupant P upon the vehicle V contacting an external object with a predetermined impact force or greater. The airbag device 10 is part of a vehicle inflatable restraint system 12 that includes an airbag module that is stored inside a cockpit module 14 of the vehicle V. The airbag module includes the airbag device 10 and an inflator 16 along with (but not shown) impact sensors, an airbag electronic control unit (ECU), a steering wheel connecting coil and an indicator lamp. These components are all interconnected by a wiring harness and powered by the vehicle's battery in a conventional manner. Since the components of the airbag module excluding the airbag device 10 are conventional, the conventional components of the airbag module will not be discussed herein for the sake of brevity.

Figure 5:
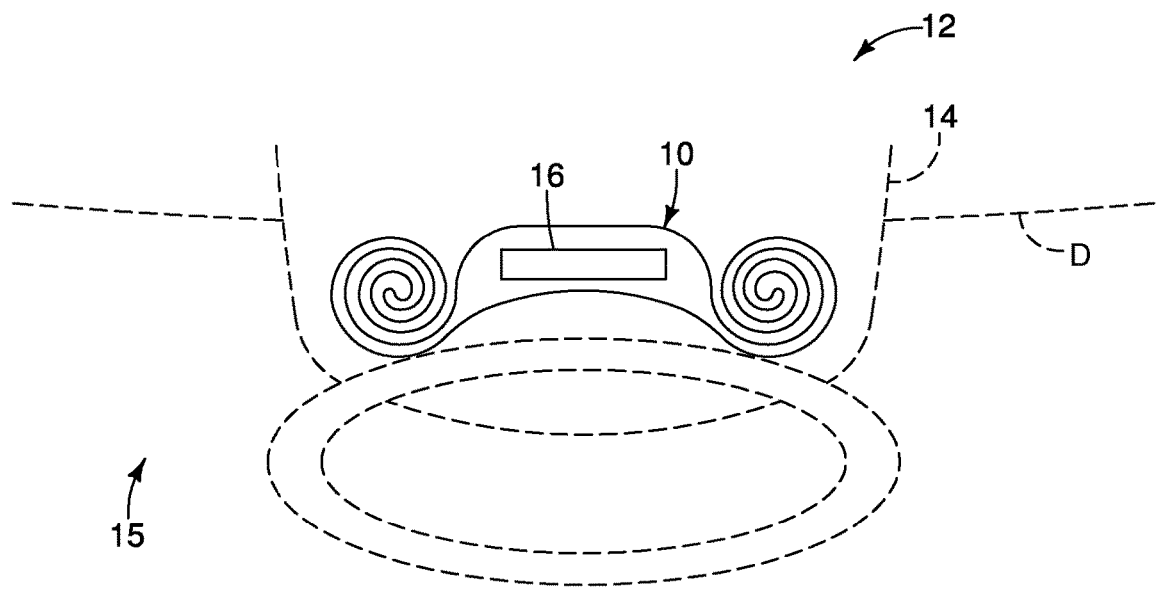
FIG. 5 is a top diagrammatic view of the airbag device of FIG. 1 stored inside a cockpit module and in an undeployed state.

As shown in FIG. 5, the airbag device 10 is folded inside the cockpit module 14 in an undeployed state. In the illustrated embodiment, the airbag device 10 is illustrated as being a knee airbag that restrains the knees of the occupant P. While, the airbag device 10 of the illustrated embodiment is illustrated as being a knee airbag, it will be apparent to those skilled in the vehicle field from this disclosure that certain aspects of the present invention can be implemented with other types of airbags (e.g., a side, rear or torso airbag) as needed and/or desired.

Figure 6:
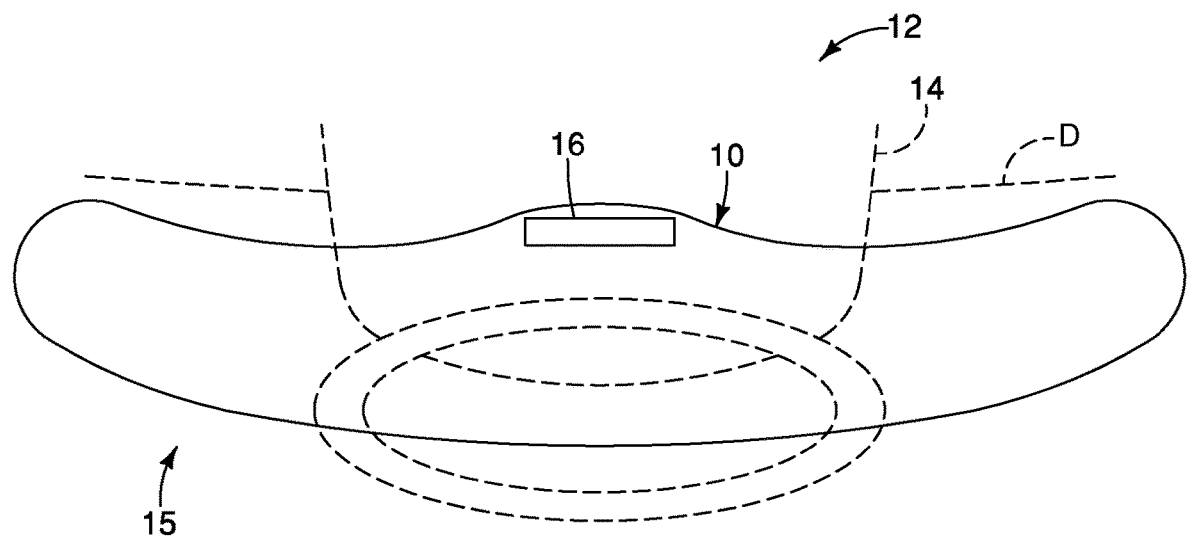
FIG. 6 is a top diagrammatic view of the airbag device of FIGS. 1 and 5 in a partially deployed state.
Figure 7:
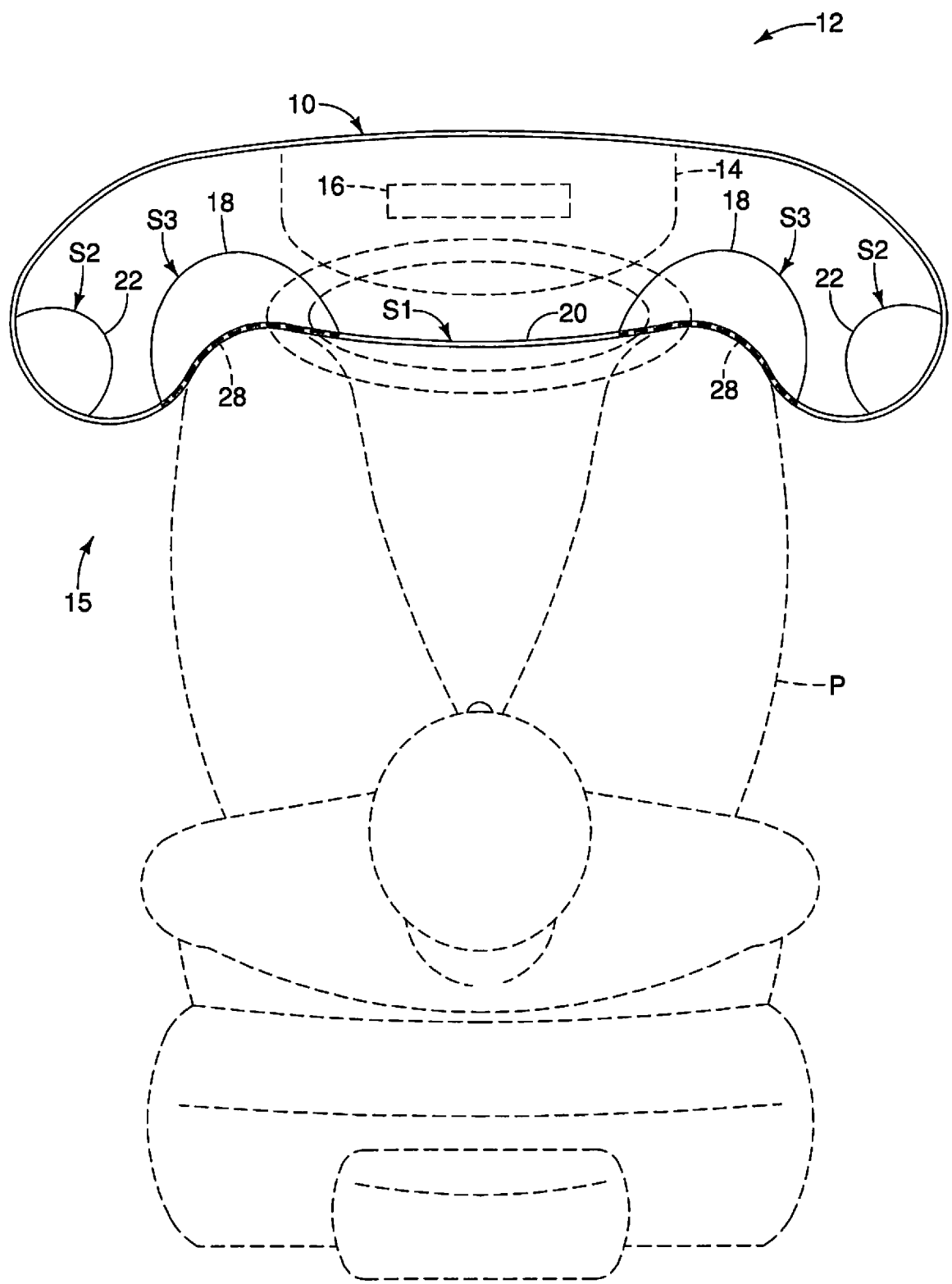
FIG. 7 is a top diagrammatic view of the airbag device of FIGS. 1, 5, and 6 contacting a passenger.
Figure 8:
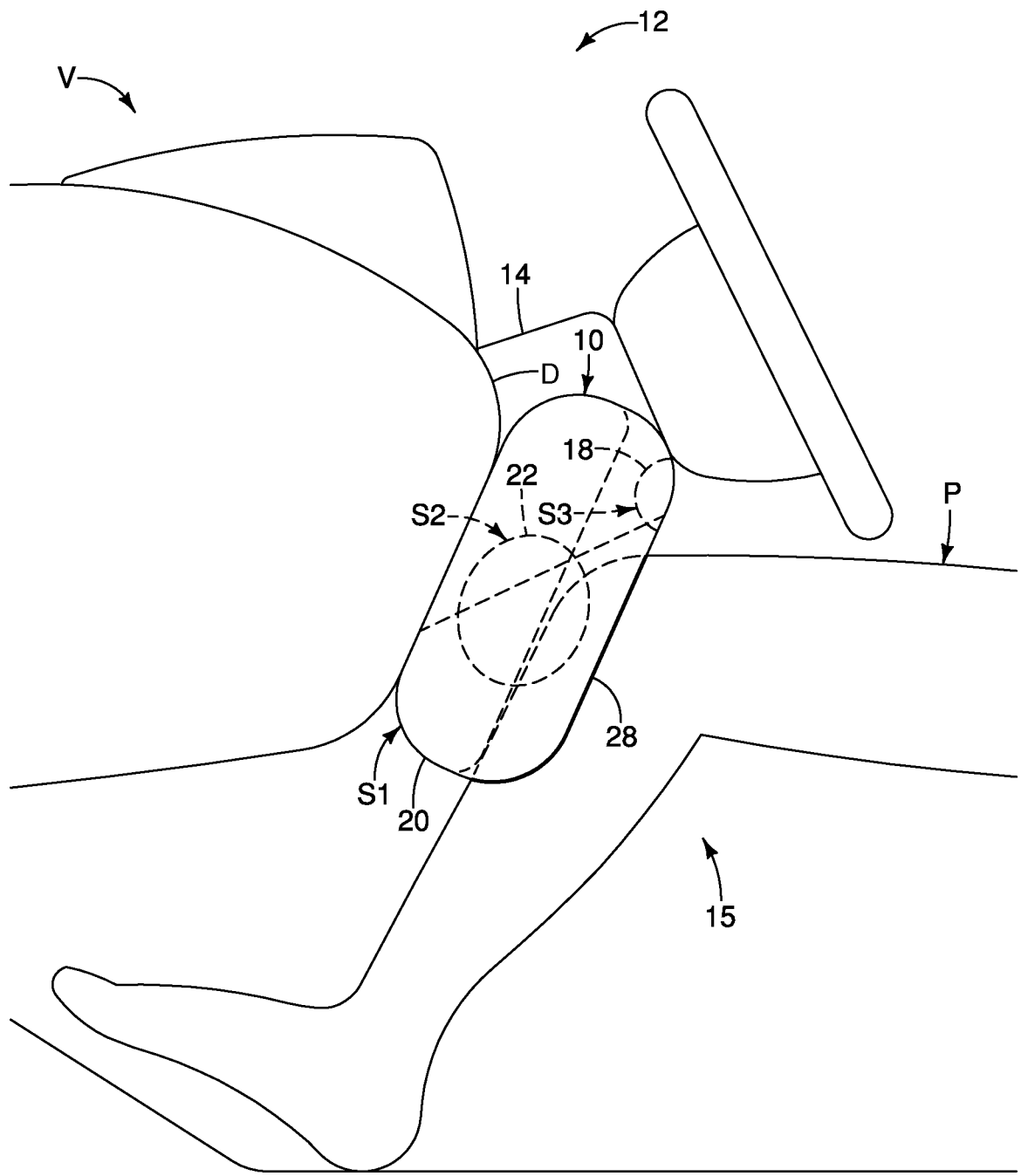
FIG. 8 is a side diagrammatic view of the airbag device of FIGS. 1 and 5 contacting a passenger.
Figure 9:
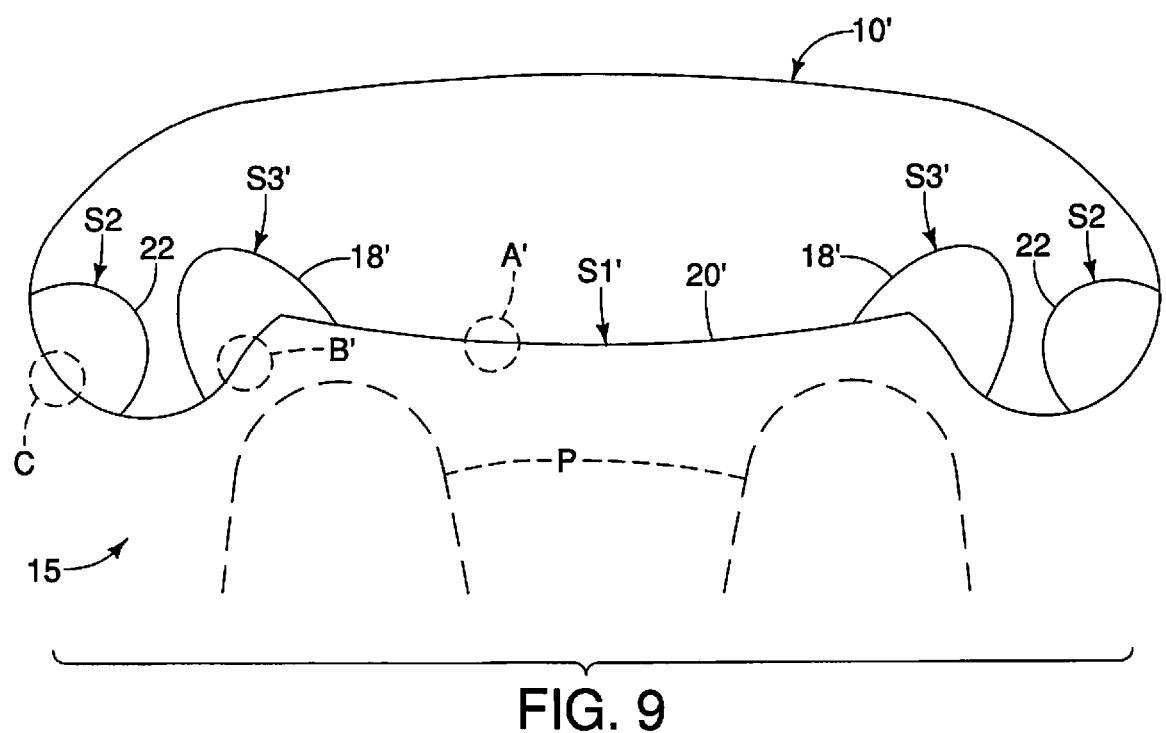
FIG. 9 is a top diagrammatic view of an airbag device having a plurality of zones state in accordance with a second illustrated embodiment, with the airbag device in a deployed state.
Figure 10:
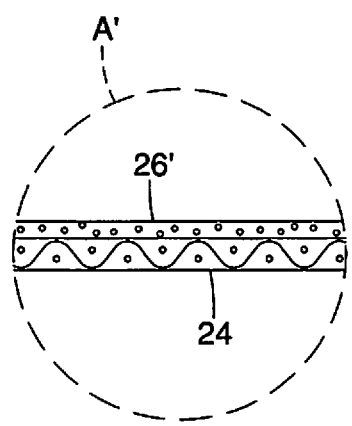
FIG. 10 is an enlarged partial cross-sectional view of the circled portion A' of the airbag device indicated in broken lines on FIG. 9.
Figure 11:
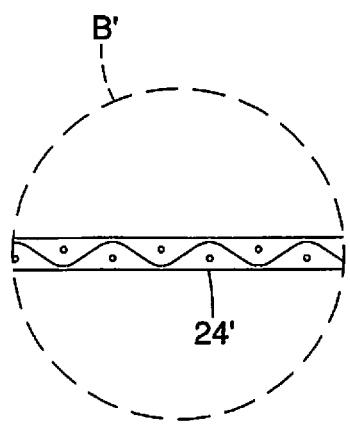
FIG. 11 is an enlarged partial cross-sectional view of the circled portion B' of the airbag device indicated in broken lines on FIG. 9.
Figure 12:
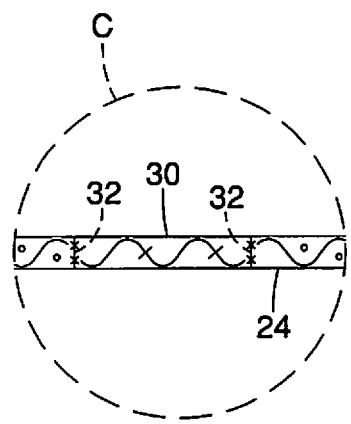
FIG. 12 is an enlarged partial cross-sectional view of the circled portion C of the airbag device indicated in broken lines on FIG. 9.

When the airbag ECU determines that vehicle contact with an external object has occurred and that the criteria for deployment of the airbag device 10 has been met, the airbag ECU triggers various firing circuits to deploy an ignition current to the inflator 16 to supply a large amount of gas to the airbag device 10. The airbag device 10 is inflated and deployed from the inside of the cockpit module 14 toward the passenger compartment 15. When the airbag device 10 receives the gas from the inflator 16 and is deployed, an airbag door (not shown) in the cockpit module 14 is opened due to the deployment pressure. As a result, the airbag device 10 is inflated and deployed from behind of the cockpit module 14 toward the passenger compartment 15 to the deployed state as seen in FIGS. 6 to 8.

Typically, upon deployment of a conventional airbag, the expanding gas inflates the airbag envelope. When the occupant P contacts a conventional airbag, the gas is vented through openings in the vehicle body-facing side of the airbag. The airbag is nearly deflated after impact via openings in the vehicle body-facing side of the airbag. In contrast, the airbag device 10 of the illustrated embodiment is provided with one or more high permeability zone(s) enabling venting of gas from the airbag primarily through the high permeability zone(s) without need for an open vent.

In particular, referring to FIGS. 1 to 4, the airbag device 10 of the illustrated embodiment is provided with a plurality of high permeability zones 18. In the case of a knee airbag, as shown, the airbag device 10 has two of the high permeability zones 18 that are located in the areas of the knees of the occupant P. In the case of other airbags, there can be one or more than two of the high permeability zones 18. The airbag device 10 further includes a low permeability zone 20 that defines a majority of the surface area of the airbag device 10. In the illustrated embodiment, the low permeability zone 20 has a first permeability characteristic, while the high permeability zones 18 each have a second air permeability characteristic that is different from the first air permeability characteristic. As a result, an overall permeability characteristic of the airbag device 10 is between the first and second permeability characteristics. By adjusting the surface area, the size and/or location of either one of the high permeability zones 18, the overall permeability characteristic of the airbag device 10 can be finely adjusted.

In addition, as seen in FIG. 1, the airbag device 10 of the illustrated embodiment is further provided with a plurality of heat dissipation zones 22. In the case of a knee airbag, as shown, the airbag device 10 has two of the heat dissipation zones 22 that are located at the lateral ends of the airbag device 10. In the case of other airbags, there can be one or more than two of the heat dissipation zones 22. Each of the heat dissipation zones 22 has a heat dissipation characteristic that is different from that of the high permeability zones 18 and the low permeability zone 20 such that more heat is dissipated through the heat dissipation zones 22 in comparison with the other zones. While the airbag device 10 of the illustrated embodiment is shown as including a pair of the high permeability zones 18 and a pair of the heat dissipation zones 22, as mentioned above, it will be apparent to those in the vehicle field from this disclosure that the airbag device 10 can be provided as having fewer or additional ones of the above-mentioned zones in different sizes and configurations on the airbag device 10 to adjust the overall permeability and heat dissipation of the airbag device 10. Further, as stated, while the high permeability zones 18 and the heat dissipation zones 22 are illustrated as being provided on a knee airbag, it will be apparent to those skilled in the vehicle field from this disclosure that the airbag device 10 can be other types of airbags (e.g., a side, rear or torso airbag) having the high permeability zones 18 and the heat dissipation zones 22 as needed and/or desired.

In the illustrated embodiment, the low permeability zone 20 can be considered a first section S1 while the heat dissipation zones 22 can together be considered a second section S2. Thus, the airbag device 10 comprises the first section S1 and the second section S2. In the illustrated embodiment, the high permeability zones 18 together can be considered a third section S3. Thus, the airbag device 10 further comprises the third section S3, as will be further discussed below.

Referring to FIGS. 1 and 2, the low permeability zone 20 will now be discussed in greater detail. The low permeability zone 20 of the illustrated embodiment generally defines a majority of the surface area of the airbag device 10. As shown in FIG. 2, the low permeability zone 20 includes a first layer 24 of material and a second layer 26 of material. Preferably, the low permeability zone 20 is composed of a nylon fabric having the desired and suitable permeability characteristics. For example, the first layer 24 can be a high permeable nylon fabric layer and the second layer can be a low permeable nylon fabric layer that is disposed over the high permeable nylon fabric layer by conventional methods known in the art.

The materials of the first and second layers can include (by way of example only and not limited to) woven fabrics, knitted fabrics, non-woven fabrics, films and combinations thereof. Woven fabrics may be preferred with woven fabrics formed of tightly woven construction such as plain or panama weave constructions. Woven fabrics may be formed from yarns of polyester, polyamides such as nylon 6 and nylon-6,6 or other suitable material as may be known to those in the skill in the art. Multifilament yarns having a relatively low denier per filament rating of not greater than about 1 to 4 denier per filament may be desirable for improved foldability. Further, to increase the strength of the first and second layers, a higher denier (i.e., weight) material may be used.

Alternatively, instead of being a woven fabric layer, the second layer can be a coating layer, as will be further discussed below. In the illustrated embodiment, the first layer 24 is considered a base layer of the airbag device 10 that is more permeable than the second layer that is provided over the base layer via conventional methods known in the art. While the low permeability zone 20 is illustrated as including two layers, it will be apparent to those skilled in the vehicle field from this disclosure that the low permeability zone 20 can include additional layers, or just one thickened nylon fabric layer to adjust the permeability of the low permeability zone 20.

As another alternative, the permeability characteristic of the low permeability zone 20 can be adjusted by altering a material composition of the low permeability zone 20, such as by altering the weaving and stitch count of either the first and/or second layers 24 and 26. In other words, the first and/or second layers 24 and 26 can be composed of a nylon fabric with tight weaving or high stitch count so that the low permeability zone 20 permeates gas at a low rate. Alternatively, the second layer 26 can also have a higher weaving density or include finishing treatments such as calendering to adjust the air permeability of the second layer 26.

It will be apparent to those skilled in the vehicle field from this disclosure that the number of layers and the exact nature of the material composition of the low permeability zone 20 can be varied as needed and/or desired, but that the low permeability zone 20 be less permeable than the first and second high permeability zones 18. In other words, the low permeability zone 20 can include a variety number of layers and the material composition of the low permeability zone 20 can also be variable just so long as the low permeability zone 20 is less permeable with respect to the first and second high permeability zones 18.

The high permeability zones 18 will now be discussed in greater detail. As best seen in FIGS. 7 and 8, the high permeability zones 18 are disposed adjacent a passenger contact zone 28 of the airbag device 10. Preferably, the high permeability zones 18 are each disposed directly next to the passenger contact zone 28 with first and second ones of the high permeability zones 18 being spaced from one another. As shown, the high permeability zones 18 are disposed above the passenger contact zone 28 that contacts the knees. Thus, the high permeability zones 18 do not overlap with the passenger contact zone 28 so that permeation of the gas through the high permeability zones 18 is not encumbered by passenger contact. Preferably, the high permeability zones 18 are disposed on an upper area of the airbag device 10 to permeate gas through the high permeability zones 18 into the passenger compartment 15. Thus, it is preferable that the high permeability zones 18 face the passenger compartment 15 rather than the dashboard D. It will be apparent to those skilled in the vehicle field from this disclosure that the high permeability zones 18 can be disposed at a variety of locations on the airbag device 10 to permeate gas into the passenger compartment 15.

In the illustrated embodiment, the high permeability zones 18 are identical. However, it will be apparent to those skilled in the vehicle field from this disclosure that the high permeability zones 18 can differ from each other with respect to the thickness of the first layer 24 and/or include different number of layers so as long as the high permeability zones 18 permeate air at a higher rate than the low permeability zone 20. For brevity and simplicity, only one of the high permeability zones 18 will be further discussed. As seen in FIGS. 1 and 3, the high permeability zone includes a single layer that is the first layer 24 of material. As stated, the first layer 24 is considered a base layer of the airbag device 10. Thus, the airbag device 10 of the illustrated embodiment is provided with the base layer that spans the substantially the entirety of the airbag device 10 and the second layer 26 is provided over the base layer at desired portions (e.g., at the low permeability zone 20).

As stated, the overall permeability of the airbag device 10 can be finely adjusted by adjusting the size and configuration of the any of the high permeability zones 18 so that the overall permeability is between the permeability of the high permeability zones 18 and the low permeability zone 20. In particular, the overall permeability of the airbag device 10 can be calculated as follows, with c representing the overall permeability of the airbag device 10, a being the permeability of airbag device 10 if only the second layer 26 is used (i.e., a low permeability fabric is used), b being the overall permeability of the airbag device 10 if only the first layer 24 is used (i.e., a high permeability fabric is used), θ being the percent coverage of the low permeability zone 20 and γ being the percent coverage of the high permeability zone(s):

$$c=\theta a+\gamma b$$

$$\theta+\gamma=1, \text{ therefore } \gamma=1-\theta$$

$$c=\theta a+(1-\theta)b$$

$$c=\theta(a-b)+b$$

$0<a<b$ and $0<\theta<1$, therefore:

$$\theta(a-b)<0 \text{ and } |\theta(a-b)|<b$$

As shown, an overall permeability of the airbag device 10 that is between the permeability of the high permeability zones 18 and the low permeability zone 20 can be achieved (i.e., c is between a and b). In the illustrated embodiment, by adjusting the ratio of the high permeability zones 18 with respect to the low permeability zone 20, the overall permeability of the airbag device 10 can be tuned in finer increments than if just the fabric and coating characteristics of the airbag device 10 were changed. Further, in the illustrated embodiment, the overall permeability of the airbag device 10 can be controlled by using different types of fabric/material having different permeability characteristics.

Referring now to FIGS. 1 and 2, the heat dissipation zones 22 will now be discussed. In the illustrated embodiment, the heat dissipation zones 22 are each provided on outer portions of the airbag device 10 laterally outward of the high permeability zones 18. Preferably, the heat dissipation zones 22 do not overlap with the passenger contact zone 28. Further, it is preferable that the heat dissipation zones 22 be spaced from the passenger contact zone 28 and face away from the dashboard D. It will be apparent to those skilled in the vehicle field from this disclosure that the heat dissipation zones 22 can be provided at a variety of locations on the airbag device 10 depending on the size and dimensions of the airbag device 10. It will be apparent to those skilled in the vehicle field from this disclosure that the airbag device 10 can include additional or fewer heat dissipation zones 22 of different sizes and dimensions to fit the size and dimension of the airbag device 10 as needed and/or desired.

In the illustrated embodiment, the heat dissipation zones 22 are identical except with respect to their location on the airbag device 10. For brevity, only one of the heat dissipation zones 22 will be discussed. Referring to FIG. 4, the heat dissipation zone 22 is defined by a third layer 30 of material having a thermal transfer coefficient that is higher than that of either of the materials of the first and second layers 24 and 26. In other words, the quantity of heat transmitted through a unit thickness of the material of the third layer 30—in a direction normal to a surface of unit area due to a unit temperature gradient under steady state conditions—is higher than the quantity of heat transmitted through a unit thickness of the materials of the first and second layers 24 and 26. For example, the material of the third layer 30 can be nylon fabric having a high thermal transfer coefficient.

In the illustrated embodiment, the third layer 30 is attached to the first layer 24 via seams 32 and other appropriate methods. In other words, the material of the heat dissipation zone is attached to the first layer 24 via a patchwork style. This is in contrast to the low permeability zone 20, which has the second layer 26 provided over the first layer 24.

In the illustrated embodiment, the material of the first layer 24 can be considered a first material, while the material of the third layer 30 can be considered a second material. In the illustrated embodiment, the material of the second layer 26 can be considered a third material. Thus, the first section S1 (the low permeability zone 20) is at least defined by the first material, which has a first heat dissipating characteristic (e.g., thermal transfer coefficient). The second section S2 (the heat dissipation zone) is defined by the second material having a second heat dissipating characteristic (e.g., a higher thermal transfer coefficient with respect to the first material). The second section S2 dissipates heat at a higher rate than the first section S1 when the airbag device 10 is deployed. Preferably, in the illustrated embodiment, the third material of the second layer 26 has a third heat dissipating characteristic such that the third material dissipates heat at a lower rate than the second material.

In the illustrated embodiment, the low permeability zone 20 is a layered section. Thus, the first section S1 is a layered section that includes more layers than the second section S2. As previously stated, the low permeability zone 20 (or the first section S1) can include coating. In the illustrated embodiment, the first section S1 has a first permeability characteristic, while the third section S3 (the high permeability zones 18) has a second permeability characteristic. Preferably, due to the different layered configuration of the third section S3 with respect to the first section S1, the second permeability characteristic is different from the first air permeability characteristic. In the illustrated embodiment, the first and second air permeability characteristics are different such that an overall permeability characteristic of the airbag device 10 is between the first and second permeability characteristics.

Referring now to FIGS. 9 to 12, an airbag device 10' in accordance with a second embodiment will now be discussed. Due to the similarity between the airbag device 10' and the airbag device 10, corresponding identical components will receive the same reference numerals, and all modified components will receive the same reference numerals followed by the prime symbol (').

The airbag device 10' includes a first section S1' that is a low permeability zone 20', the second section S2 with the heat dissipation zones 22 of the first embodiment, and a third section S3' that includes a pair of high permeability zones 18'. The airbag device 10' of the second embodiment is identical to that of the first embodiment, except that the low permeability zone 20' includes a first layer 24 of fabric that is coated with a coating layer that is a second layer 26'. For example, the coating or second layer 26' can be comprised of neoprene, silicone urethanes or disperse polyamides. Coatings such as dispersed polyamides having a dry add-on weight of about 0.6 ounces per square yard or less may be particularly preferred so as to minimize fabric weight and enhance foldability. The coating layer can have increased or decreased thickness to alter the permeability of the second layer 26' and the low permeability zone 20'.

Further, each of the high permeability zones 18' of the airbag device 10' of the second embodiment includes a modified fabric layer 24' that is stitched to the layer of fabric of the low permeability zone 20' (e.g., stitched to the first layer 24). Thus, the first layer 24 of fabric of the airbag device 10' is not a base layer of both the low permeability zone 20' and the high permeability zones 18', as was with the airbag device 10 of the first illustrated embodiment. As a result, the airbag device 10' of the second illustrated embodiment is constructed of a patchwork configuration composed of the multiple zones of panels of fabric stitched or connected together via conventional methods. To increase the strength of the sewing stitches, the thread diameter or size may be increased, or a material with a higher tensile strength may be used. Alternatively, it will be apparent to those skilled in the vehicle field from this disclosure that the first and third sections S1' and S3' can be attached via an adhesive or sealant instead of or in addition stitching to interconnect the zones.

Further, the material of the modified fabric layer 24' of the high permeability zones 18' can be different from the material of the low permeability zone 20'. For example, the material of the modified fabric layer 24' can be composed of a woven material that is more porous such that the high permeability zones 18' permeate gas at a faster rate than the low permeability zone 20'. Thus, in the illustrated embodiment, the first layer 24 of the low permeability zone 20' is composed of a first fabric material and the modified fabric layer 24' of the high permeability zones 18' is composed of a second fabric material. The first and second fabric materials are disposed adjacent to each other.

Alternatively, the second fabric material can have a lower stitch count or weaving configuration such that the second fabric material is more porous than the first material. In other words, the material compositions of the first and second fabric materials can be different such that the high permeability zones 18' permeate gas at a faster rate. Thus, the material compositions of the first and second materials can be disposed adjacent each other.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, as used herein to describe the above embodiment(s), the following directional terms "forward", "rearward", "above", "downward", "vertical", "horizontal", "below" and "transverse" as well as any other similar directional terms refer to those directions of a vehicle equipped with the airbag device. Accordingly, these terms, as utilized to describe the present invention should be interpreted relative to a vehicle equipped with the airbag device.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An airbag device comprising:
a first section defined by a first material having a first heat dissipating characteristic, the first section further including coating layered over the first material;
a second section defined by a second material having a second heat dissipating characteristic, the second section dissipating heat at a higher rate than the first section when the airbag device is deployed; and
a third section that is a passenger contact section and is non-coated, the third section having the first material and being defined by a first air permeability characteristic that is different from an air permeability characteristic of either the first section or the second section.

2. The airbag device according to claim 1, wherein the first section includes more layers than the second section.

3. The airbag device according to claim 1, wherein the airbag device is a knee airbag.

4. An airbag device comprising:
a first section defined by a first material having a first heat dissipating characteristic, the first section further including coating layered over the first material;
a second section defined by a second material having a second heat dissipating characteristic, the second section dissipating heat at a higher rate than the first section when the airbag device is deployed; and
a third section that is a passenger contact section, the third section having the first material and being defined by a first air permeability characteristic that is different from an air permeability characteristic of either the first section or the second section,
the first section having a second air permeability characteristic that is different from the first air permeability characteristic of the third section such that an overall permeability characteristic of the airbag device is between the first and second permeability characteristics.

5. The airbag device according to claim 4, wherein the first permeability characteristic of the third section is defined by the first material and the second permeability characteristic of the first section is defined by the first material and the coating layer such that the third section is more permeable than the first section.

6. The airbag device according to claim 5, wherein the coating of the first section is a third material, the third material being layered over the first material.

7. The airbag device according to claim 5, wherein the second section includes more materials than the third section.

8. The airbag device according to claim 4, wherein the first material defines a first material composition of the third section,
the first material and the coating layer defines a second material composition of the first section.

9. The airbag device according to claim 8, wherein the second section includes a third material composition defined by the second material and the first material, the second material being disposed adjacent to the first material in the second section.

10. An airbag device comprising:
a first section having a first permeability characteristic, the first section including coating;
a second section having a heat dissipating characteristic, the second section being non-coated; and
a third section having a second permeability characteristic that is different from the first permeability characteristic such that an overall permeability characteristic of the airbag device is between the first and second permeability characteristics, the third section being a non-coated section, the first section being a layered section that includes more layers than the second section and the third section,
the heat dissipating characteristic of the second section being different from a heat dissipating characteristic of both the first and third sections.

11. An airbag device comprising:
a pair of first permeability sections that is each a passenger contact section having a first air permeability characteristic defined by a first material, the passenger contact sections being non-coated sections; and
a second permeability section positioned between the pair of first permeability sections, the second permeability section having the first material defined by the first air permeability characteristic and further having coating layered over the first material such that the second permeability section having a second permeability characteristic that is different from the first permeability characteristic, the second permeability section being disposed directly next to the first permeability sections.

12. The airbag device according to claim 11, further comprising
a heat dissipating section spaced from the passenger contact section.

13. An airbag device comprising:
a first section defined by a first material having a first heat dissipating characteristic, the first section further including coating layered over the first material;
a second section defined by a second material having a second heat dissipating characteristic, the second section dissipating heat at a higher rate than the first section when the airbag device is deployed; and
a third section that is a passenger contact section, the third section having the first material and being defined by a first air permeability characteristic that is different from an air permeability characteristic of either the first section or the second section, the third section is disposed directly adjacent to the first section and is positioned between the first section and the second section.

14. An airbag device comprising:
first section defined by a first material having a first heat dissipating characteristic, the first section further including coating layered over the first material;
a second section defined by a second material having a second heat dissipating characteristic, the second section dissipating heat at a higher rate than the first section when the airbag device is deployed; and
a third section that is a passenger contact section, the third section having the first material and being defined by a first air permeability characteristic that is different from an air permeability characteristic of either the first section or the second section, the third section including first and second passenger contact areas, the first section extending between the first and second passenger contact areas of the third section.

* * * * *